(12) United States Patent
Zhou (10) Patent No.: US 12,332,087 B2
(45) Date of Patent: Jun. 17, 2025

(54) CLUTCH ACTUATOR, DETECTION SYSTEM AND METHOD FOR DETECTING AN ANGULAR POSITION OF A ROTARY COMPONENT

(71) Applicant: Schaeffler Technologies AG & Co. KG, Herzogenaurach (DE)

(72) Inventor: Jie Zhou, Baden-Baden (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 503 days.

(21) Appl. No.: 17/793,470

(22) PCT Filed: Jan. 12, 2021

(86) PCT No.: PCT/DE2021/100017
§ 371 (c)(1),
(2) Date: Jul. 18, 2022

(87) PCT Pub. No.: WO2021/151416
PCT Pub. Date: Aug. 5, 2021

(65) Prior Publication Data
US 2023/0069443 A1    Mar. 2, 2023

(30) Foreign Application Priority Data
Jan. 29, 2020 (DE) .................. 10 2020 102 063.5

(51) Int. Cl.
*G01D 5/14* (2006.01)
*G01D 3/02* (2006.01)
(Continued)

(52) U.S. Cl.
CPC ............. *G01D 3/02* (2013.01); *G01D 5/145* (2013.01); *G01D 5/24471* (2013.01); *F16D 2025/081* (2013.01); *F16D 2300/18* (2013.01)

(58) Field of Classification Search
CPC ...... G01D 3/02; G01D 5/145; G01D 5/24471; G01D 5/24476; F16D 2025/081; F16D 2300/18; F16D 29/005; H02K 11/215
See application file for complete search history.

(56) References Cited

U.S. PATENT DOCUMENTS

2005/0030012 A1*  2/2005  Kunz-Vizenetz ...... G01D 5/145
                                                        324/207.25
2007/0201171 A1   8/2007  Kanekawa
(Continued)

FOREIGN PATENT DOCUMENTS

CN       108627082 A      10/2018
DE    102017128891 A1      6/2019
(Continued)

OTHER PUBLICATIONS

Author: Han Peng Liu Xueting Title: Digital communications technology Date: Dec. 2017 pp. 20-23 Publisher: Mechanical Industry Press.

*Primary Examiner* — Shelby A Turner
*Assistant Examiner* — Christine Y Liao (57) ABSTRACT

A first sensor signal and a second sensor signal are provided by a sensor unit to an evaluation unit. The first sensor signal is dependent on the angular position, and the second sensor signal is phase-shifted by 90° with respect to the first sensor signal. A noise value that is superimposed on each sensor signal due to noise in the corresponding sensor signal is determined by the evaluation unit. Each sensor signal is corrected by the evaluation unit based on the noise value determined for the corresponding sensor signal. Highest amplitudes for each of the first and second sensor signals are determined by the evaluation unit as a maximum value of amplitudes of the respective sensor signals detected over multiple revolutions of the rotational element. An angular position of a rotational component is determined by the
(Continued)

evaluation unit based on output from an atan 2-function that takes the first and second sensor signals and the highest amplitudes as input.

20 Claims, 6 Drawing Sheets

(51) Int. Cl.
  *G01D 5/244* (2006.01)
  *F16D 25/08* (2006.01)

(56) References Cited

U.S. PATENT DOCUMENTS

2016/0041010 A1* 2/2016 Hara .................... G01D 5/2451
324/207.13

2023/0046131 A1 2/2023 Zhou
2023/0079776 A1 3/2023 Zhou

FOREIGN PATENT DOCUMENTS

| | | |
|---|---|---|
| DE | 102017222508 A1 | 6/2019 |
| DE | 102017202217 B4 | 7/2019 |
| DE | 102018131708 A1 | 6/2020 |
| EP | 2674729 A1 | 12/2013 |
| JP | 2006013885 A | 1/2006 |
| JP | 2008170178 A | 7/2008 |
| JP | 2011237324 A | 11/2011 |
| JP | 2015114221 A | 6/2015 |
| JP | 2016090167 A | 5/2016 |
| JP | 2016136989 A | 8/2016 |
| WO | 2006132118 A1 | 12/2006 |
| WO | 2012035077 A1 | 3/2012 |
| WO | 2018219388 A1 | 12/2018 |

* cited by examiner

CLUTCH ACTUATOR, DETECTION SYSTEM AND METHOD FOR DETECTING AN ANGULAR POSITION OF A ROTARY COMPONENT

CROSS-REFERENCE TO RELATED APPLICATIONS

This application is the U.S. National Phase of PCT Appln. No. PCT/DE2021/100017 filed Jan. 12, 2021, which claims priority to DE 102020102063.5 filed Jan. 29, 2020, the entire disclosures of which are incorporated by reference herein.

TECHNICAL FIELD

The disclosure relates to a method for detecting an angular position of a rotational component. Furthermore, the disclosure relates to a detection system and a clutch actuator.

BACKGROUND

A method for detecting an angular position of a rotational component is described, for example, in WO 2018/219388 A1. A method for detecting an angular position of a rotational component that can rotate about a rotational axis is described therein, in which the angular position of the rotational component is picked up by a sensor system arranged radially at a distance from the rotational axis. A magnetic ring arranged fixedly and concentrically on the rotating component causes a magmatic field that changes relative to the sensor system and is detected by the sensor system, wherein a signal picked up by the sensor system is evaluated with regard to the angular position. The signal picked up by the sensor system is evaluated with regard to amplitude information of the magnetic field and a correction parameter is determined from the amplitude information, by means of which an angular error in the angular position picked up from the signal of the sensor system is determined. The angular error is then used to correct the angular position determined from the signal emitted by the sensor system.

SUMMARY

The disclosure provides an exemplary embodiment for detecting an angular position faster and more accurately. An actual highest amplitude of the respective sensor signal can be determined more precisely and the error in the calculation of the angular position can thus be reduced. The angular position can be detected more accurately, faster and with as little computational power as possible.

A sensor unit and the rotational component can be arranged in a vehicle. The rotational component and a rotational element may be arranged to be concentrically rotatable. The sensor unit can be designed as an angle sensor.

The sensor element can be a Hall sensor.

The rotational element can be a magnetic ring. The rotational element can be a permanent magnet. The rotational element can be diametrically magnetized.

A first and/or second sensor signal can be a periodic signal. The first sensor signal can be a sine signal, and the second sensor signal can be a cosine signal. The first sensor signal can be detected at a first measurement position, and the second sensor signal can be detected at a second measurement position, which is perpendicular thereto about a rotational axis.

The highest amplitude $\hat{A}_1$ of the first sensor signal is the maximum value of the amplitudes $A_1$ of the first sensor signal according to the following relationship $$\hat{A}_1 = \max(A_1) \quad (1)$$

The highest amplitude $\hat{A}_2$ of the second sensor signal is accordingly the maximum value of the amplitudes $A_2$ of the second sensor signal, according to $$\hat{A}_2 = \max(A_2) \quad (2)$$

To calculate the highest amplitudes in each case, the amplitudes of the sensor signals over several revolutions can be taken into account. In particular, the respective highest amplitude can be adjusted after each revolution if the amplitude of the assigned sensor signal detected during this revolution is greater than the previously detected highest amplitude of this sensor signal.

A max-min method may be used to detect the respective highest amplitudes. This can reduce the calculation effort as much as possible. However, this method is susceptible to noise affecting the sensor signal. The sensor signal and thus the amplitude and consequently also the highest amplitude can be superimposed by a noise value N.

The noise value N can be calculated using the following linear relationship $$N = f(T) \cdot g(i) \quad (3)$$

with the temperature T of the sensor unit and the probability function g. The measurement point ratio i from the number of measurement points m acquired in particular during the ongoing measurement and the angle discretization c, which corresponds, for example, to the number of measurement points in an end-of-line measurement, is defined as follows $$i = \frac{m}{c} \quad (4)$$

The number of measurement points m can be calculated from the rotational speed n and the sampling frequency $f_s$ of the sensor element as follows $$m = 60 \cdot \frac{f_s}{n} \quad (5)$$

A more accurate calculation assuming a non-linear dependence of the noise value on the probability function g can be carried out with the following relation $$N = f(T) \cdot [a \cdot g(i)^2 + b \cdot g(i) + d] \quad (6)$$

The parameters a, b and d must be determined, for example, before the sensor unit is put into operation. This relationship can be stored in a lookup table and retrieved from it during operation.

Assuming white noise, the probability function g is defined as follows $$g(i) = \sqrt{2} \cdot [\frac{2}{\sqrt{\pi}} \int_0^{2i-1} e^{-x^2} dx]^{-1} \quad (7)$$

For example, from the ratio i calculated during operation dependent on the number of measurement points m according to (4) and a lookup table mapping the relationship between i and g(i), created in particular initially, for example in an end-of-line determination, the respective associated value g(i) can be determined, possibly by linear interpolation during operation.

It is advantageous if the following applies to the relation f(T)

$$f(T)=f(T_r)\cdot[1+a_1\cdot(T-T_r)+a_2\cdot(T-T_r)^2] \quad (5)$$

with the reference temperature $T_r$ and the previously determined value $f(T_r)$ and the parameters $a_1$ and $a_2$ to be defined in advance.

In an embodiment of the disclosure, the noise value is calculated in a noise detection step and adjusted as required during operation. This means that changing environmental influences can be taken into account and a more precise calculation can be carried out.

In an embodiment of the disclosure, in an amplitude determination step, the highest amplitude of the respective sensor signal is determined as half the distance between the maximum and the minimum amplitude of the associated sensor signal. The respective amplitude A, for example at each revolution, is calculated from $$A=\frac{S_{max}-S_{min}}{2} \quad (6)$$

with the maximum amplitude $S_{max}$ and the minimum amplitude $S_{min}$ of the respective sensor signal.

Taking the noise value into account, the following relationship for calculating the amplitude may be applied $$A=\frac{S_{max}-S_{min}}{2}-N \quad (7)$$

In an embodiment of the disclosure, a possible amplitude error of the respective highest amplitude is determined and corrected in the amplitude determination step. In particular in the case of deviating highest amplitudes in the comparison between the first and second sensor signals, the highest amplitudes can be matched.

In an embodiment of the disclosure, the noise value is calculated as a function of the number of measurement points m. The calculation is preferably carried out according to (6).

In an embodiment of the disclosure, the number of measurement points m is at least 2000. This can reduce the standard deviation of the sensor signal.

In an embodiment of the disclosure, the noise value is calculated as a function of the temperature T of the sensor unit.

In an embodiment of the disclosure, the rotational component is a rotor of an electric motor or a component connected in a rotationally fixed manner to the rotor. The electric motor can be controlled in a more targeted manner via the more precisely detected angular position.

Furthermore, a detection system for detecting an angular position of a rotational component is achieved by a method having at least one of the features indicated above. The detection system comprises an evaluation unit and a sensor unit, which has a fixed sensor element and a rotational element rotatable relative thereto and jointly with the rotational component.

Furthermore, a clutch actuator for clutch actuation, having such a detection system, is provided. The clutch actuator can actuate an e-clutch in a vehicle. The clutch actuator can be a modular clutch actuator, or MCA for short. This can comprise a rotor and a spindle. The rotor can perform a rotational movement, which is converted into a linear movement of the spindle via a planetary roller screw drive, abbreviated PWG. The linear movement of the spindle can actuate the clutch.

Further advantages and advantageous embodiments of the disclosure result from the description of the figures and the drawings.

BRIEF DESCRIPTION OF THE DRAWINGS

The disclosure is described in detail below with reference to the drawings. Specifically.

DETAILED DESCRIPTION

Figure 1:
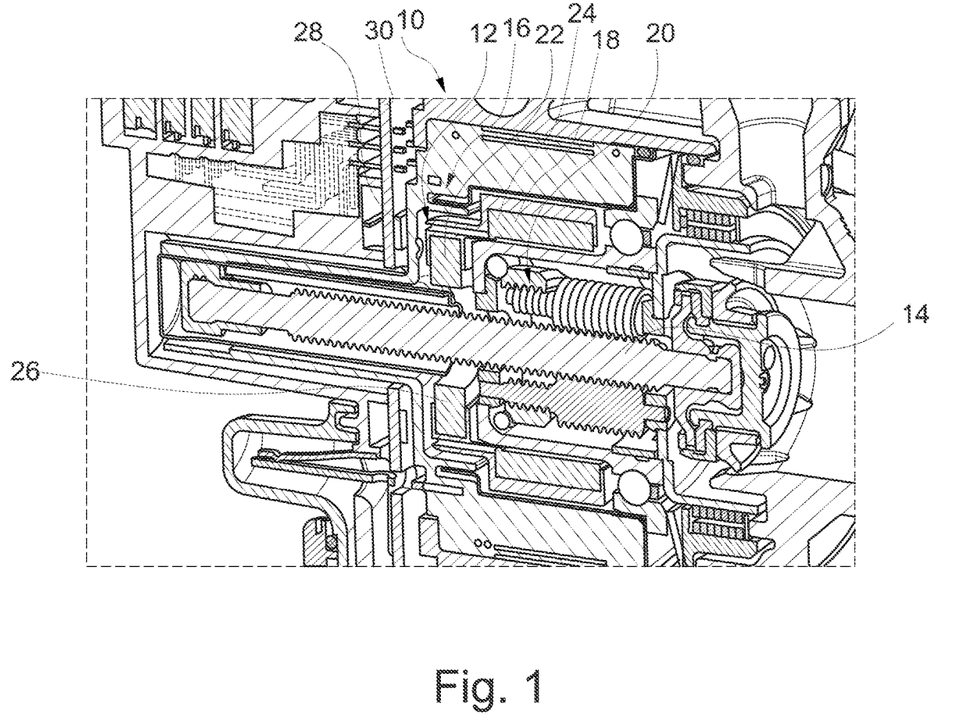
FIG. 1: shows a spatial cross-section through a clutch actuator with a sensor unit in an exemplary embodiment of the disclosure.

FIG. 1 shows a spatial cross-section through a clutch actuator 10 with a sensor unit 12 in an exemplary embodiment of the disclosure. The clutch actuator 10 is a modular clutch actuator, a so-called MCA, comprising a spindle 14 and an electric motor 16 with a rotatable rotor 18. The spindle 14 performs a linear movement for clutch actuation and is moved by a rotational movement of the electromechanically driven rotor 18 via a planetary roller screw drive 20, abbreviated PWG.

The sensor unit 12 is arranged to detect an angular position of the rotor 18 and has a rotational element 22 which is embodied as a magnetic ring 26 that is non-rotatably connected to a rotational component 24 embodied as the rotor 18. The magnetic ring 26 is in particular a permanent magnet and diametrically magnetized. The sensor unit 12 also has a sensor element 28 which is embodied as a magnetic sensor, in particular as a Hail sensor. The sensor element 28 is mounted on a circuit board 30 axially spaced from the rotational element 22 and enables a magnetic field emanating from the rotational element 22 to be detected.

The effect of the magnetic field emanating from rotational element 22 on the sensor element 28 makes it possible to detect the angular position of rotational component 24, i.e., the rotor 18, since the diametrical magnetization of the magnetic ring 26 changes the magnetic field as a function of the angular position of the rotor 18.

Figure 2:
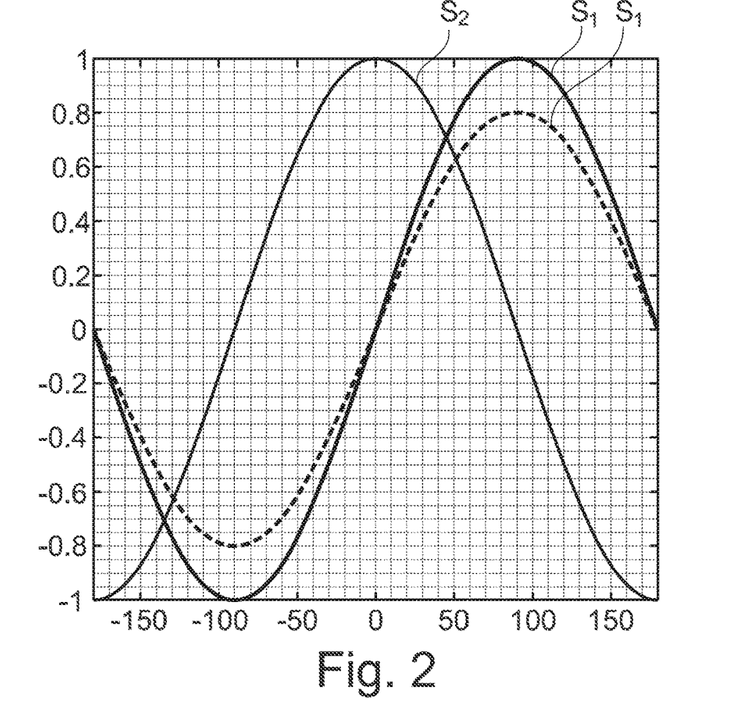
FIG. 2: shows a first and second sensor signal of a sensor unit in an exemplary embodiment of the disclosure.

FIG. 2 shows a first and second sensor signal $S_1$, $S_2$ of a sensor unit in an exemplary embodiment of the disclosure. The first sensor signal $S_1$ is a sine signal and the second sensor signal $S_2$ is a 90° phase shifted cosine signal. The first sensor signal $S_1$ arises at a first measurement position on a sensor element and the second sensor signal $S_2$ at a second measurement position on the sensor element that is perpendicular thereto about the rotational axis. The phase shift between the first sensor signal $S_1$ and the second sensor signal $S_2$ is due to the perpendicular position of the first and second measurement positions to one another.

The graph of an ideal first sensor signal $\tilde{S}_1$ is plotted in comparison with the first sensor signal $S_1$. The first sensor signal $S_1$ is subject to an amplitude shift relative to the ideal first sensor signal $\tilde{S}_1$, which reduces the amplitude. The reason for this can be attenuations, interference effects and/or measurement errors.

Figure 3:
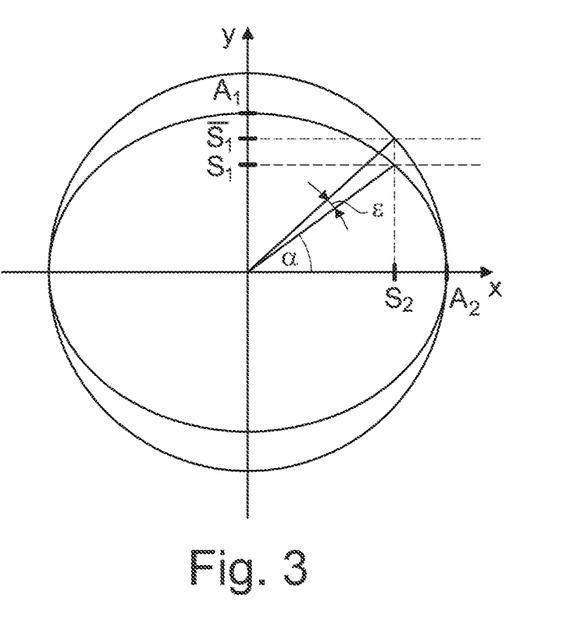
FIG. 3: shows the influence of an amplitude deviation on the angular position.

FIG. 3 shows the influence of an amplitude shift on the angular position. The first sensor signal $S_1$ is shown as a projection onto the Y-axis and the second sensor signal $S_2$ as a projection onto the x-axis. Based on the illustration in FIG. 2, the first sensor signal $S_1$ is reduced by an amplitude shift, resulting in an ellipse instead of a circle, which is the case with the idealized first and second sensor signals $\tilde{S}_1$, $\tilde{S}_2$. This causes an angular error $\epsilon$ in detecting the angular position $\alpha$. The angle error $\epsilon$, which arises due to the amplitude shift between the amplitude $A_1$ of the first sensor signal and the amplitude $A_2$ of the second sensor signal, can be calculated as follows $$\epsilon = \arcsin\frac{\gamma-1}{\gamma+1} \quad (8)$$

with $$\gamma = \frac{A_1}{A_2} \quad (9)$$

However, knowledge of the actual amplitudes of the first and second sensor signals $S_1$, $S_2$ are crucial for detecting the angular position $\alpha$. This is because the angular position $\alpha$ can be calculated using the amplitudes $A_1$, $A_2$ as a function of the first sensor signal $S_1$ and the second sensor signal $S_2$ via an atan 2 function.

In this case, the amplitudes $A_1$, $A_2$ of the first and second sensor signals $S_1$, $S_2$ may be determined using a max-min method, in which the calculation power can be kept as low as possible. The amplitudes $A_1$, $A_2$ of the first and second sensor signals $S_1$, $S_2$ recorded during the rotation of the rotational element are stored and corrected during operation of the sensor unit as soon as correspondingly higher values are determined. However, this method is susceptible to noise.

Figure 4:
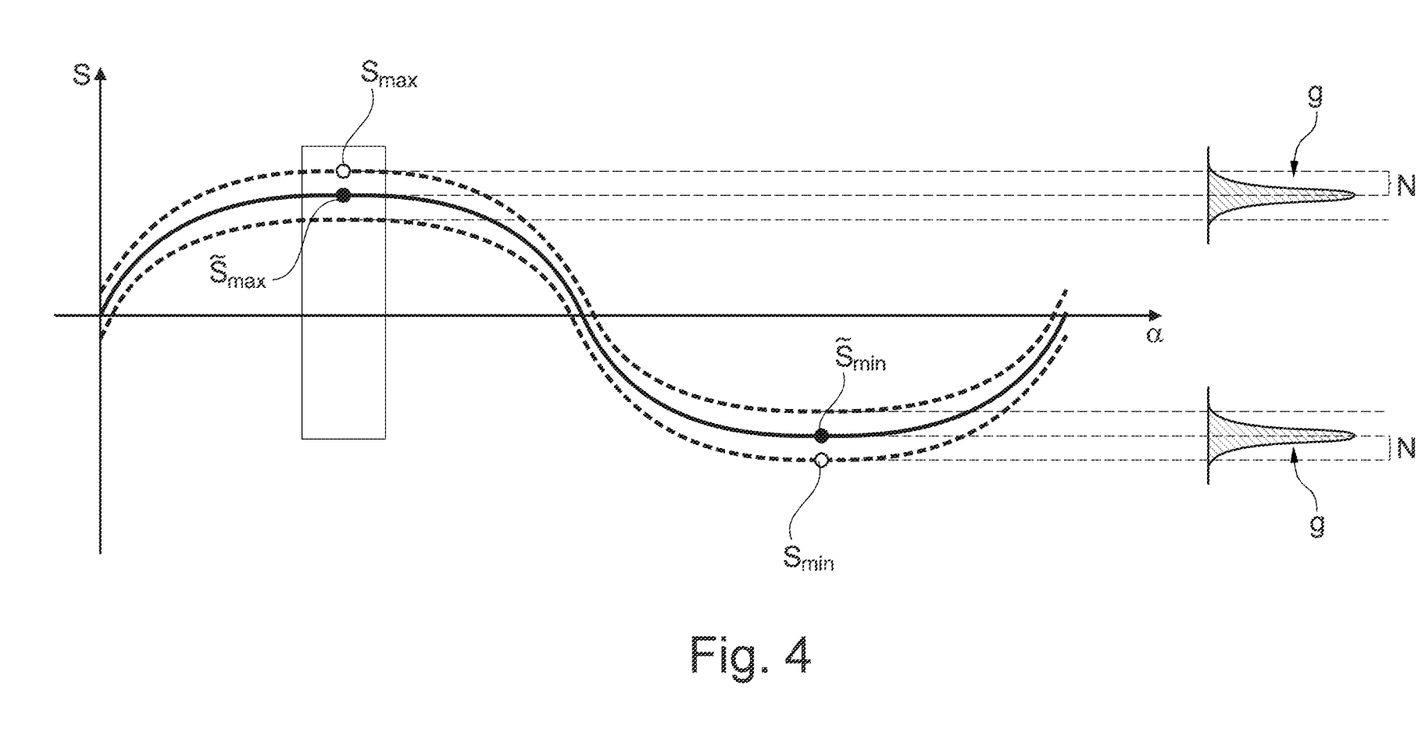
FIG. 4: shows the effect of noise on a sensor signal of the sensor unit in an exemplary embodiment of the disclosure.

FIG. 4 shows the effect of noise on a sensor signal S of the sensor unit in an exemplary embodiment of the disclosure. The solid line corresponds to an ideal curve of the sensor signal S, which can be the first or second sensor signal $S_1$, $S_2$, as a function of the angular position $\alpha$ and the dashed curves show the bandwidth of the noise-affected values of the sensor signal S.

The noise can be described by a probability function g. If the noise is assumed to be white noise, this can be represented by a normal distribution. Due to the noise, a maximum expected noise value N is assumed.

An ideal maximum amplitude $\tilde{S}_{max}$ of the sensor signal S deviates from the measured maximum amplitude $S_{max}$ of the sensor signal S. An ideal minimum amplitude $\tilde{S}_{min}$ of the sensor signal S therefore deviates from the measured minimum amplitude $S_{min}$ of the sensor signal S.

Figure 5:
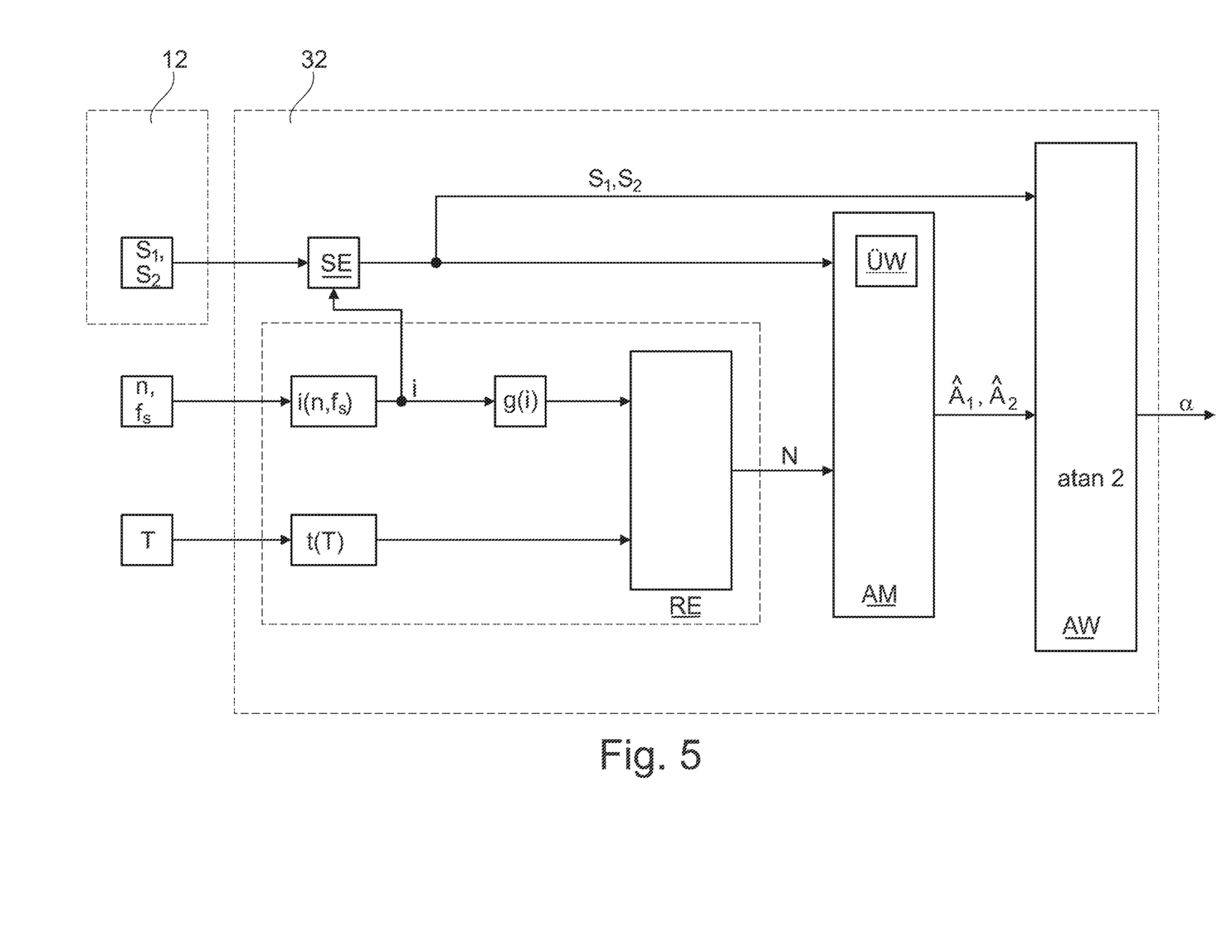
FIG. 5: shows a method for detecting an angular position in an exemplary embodiment of the disclosure.

FIG. 5 shows a method 100 for detecting an angular position $\alpha$ in an exemplary embodiment of the disclosure.

The first and second sensor signals $S_1$, $S_2$ output by the sensor unit 12 are output to an evaluation unit 32. In an amplitude determination step AM, the evaluation unit 32 determines the respective highest amplitude $\hat{A}_1$, $\hat{A}_2$ of the first and second sensor signals $S_1$, $S_2$. In an evaluation step AW, the evaluation unit 32 determines the angular position $\alpha$ using an atan 2 function that takes the first and second sensor signal $S_1$, $S_2$ and the determined highest amplitudes $\hat{A}_1$; $\hat{A}_2$ as input.

In a monitoring step ÜW, the highest amplitude $\hat{A}_1$ of the first sensor signal $S_1$ and the highest amplitude $\hat{A}_2$ of the second sensor signal $S_2$ is calculated in each case as the maximum value of the respective sensor signals $S_1$, $S_2$ determined over at least one revolution of the rotational element 22. The highest amplitude $\hat{A}_1$ of the first sensor signal $S_1$ is the maximum value of the amplitude $A_1$ of the first sensor signal $S_1$ and can be calculated via (1).

Accordingly, the highest amplitude $\hat{A}_2$ of the second sensor signal $S_2$ is the maximum value of the amplitude $A_2$ of the second sensor signal $S_2$, following the calculation according to (2).

The respective amplitude A, for example at each revolution, is calculated according to (6) with the maximum amplitude $S_{max}$ and the minimum amplitude $S_{min}$ of the respective sensor signal $S_1$, $S_2$.

In a signal detection step SE, the evaluation unit 32 calculates the respective sensor signal $S_1$, $S_2$ based on a number of measurement points m of the sensor element 28. The number of measurement points m can be calculated from a rotational speed n and a sampling frequency $f_s$ of the sensor element 28 according to (5).

In a noise detection step RE preceding the amplitude determination step AM, a noise value N, which is superimposed on the corresponding first and/or second sensor signal $S_1$, $S_2$, is calculated and transferred to the amplitude determination step AM, in which the former is taken into account according to (7).

As a result, the amplitude A and also the highest amplitude $\hat{A}_1$, $\hat{A}_2$ of the respective sensor signal $S_1$, $S_2$ can be determined more precisely and the error E in the calculation of the angular position $\alpha$ can thus be reduced. The angular position $\alpha$ can be detected more accurately, faster and with as little computational power as possible.

The noise value N is calculated and taken into account at least in each revolution, for example. The noise value N can be calculated from the relation according to (3), with the temperature T of the sensor unit 12, the probability function g and with the measurement point ratio i, which can be calculated from (5).

It is advantageous if the relation f(T) is described by (5), with the reference temperature $T_r$ and the previously determined value $f(T_r)$ and the parameters $a_1$ and $a_2$ to be defined in advance, for example before commissioning.

A more precise calculation with an assumed non-linear profile of the noise value N can be performed using (6).

The parameters a, b and c must be determined, for example, before the sensor unit 12 is commissioned. This relationship can be stored in a lookup table and retrieved from it during operation.

Assuming white noise, the probability function g is a normal distribution and can be calculated via (7).

Figure 6:
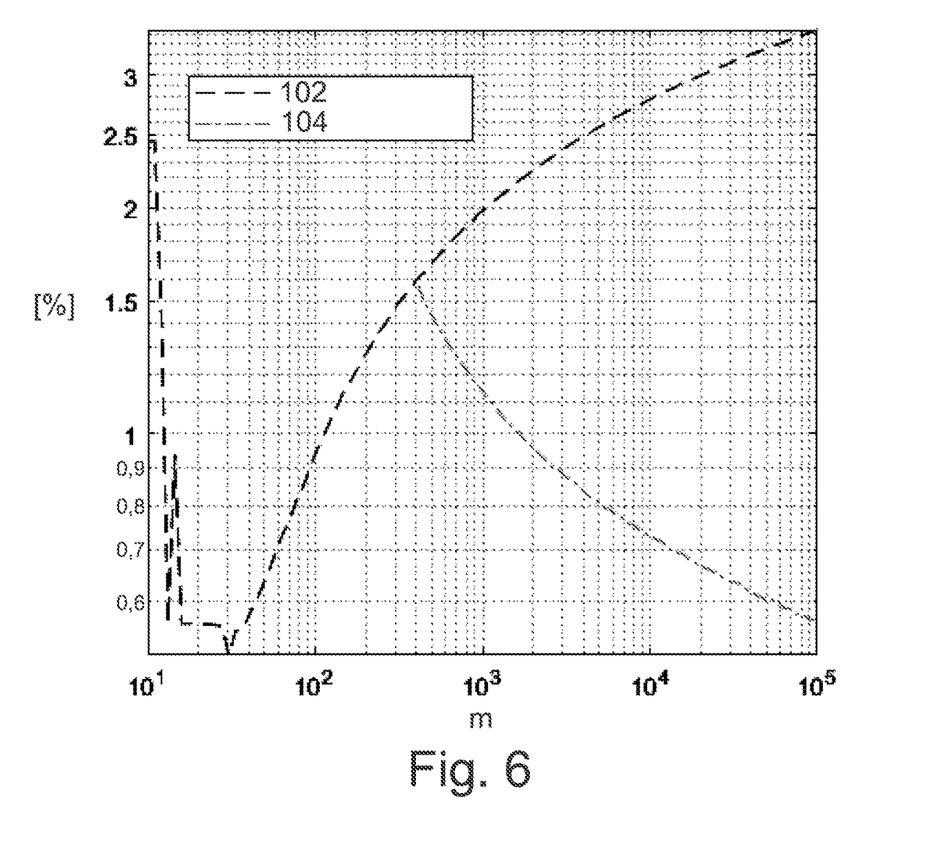
FIG. 6: shows a comparison of the accuracy of a method in an exemplary embodiment of the disclosure versus a conventional method.

FIG. 6 shows a comparison of the accuracy of a method in an exemplary embodiment of the disclosure versus a conventional method. Curve 102 represents the accuracy curve of a conventional method as a function of the number of measurement points m and curve 104 represents the accuracy curve of a method in an exemplary embodiment of the disclosure.

Compared to curve 102, above a number of measurement points in of 400, curve 104 is far more accurate and converges with an increasing number of measurement points m. In contrast to this, the inaccuracy of the conventional method increases with an increasing number of measurement points m.

In the method in an exemplary embodiment of the disclosure, a linear dependency of the noise value N on the probability function g(i) was assumed. For example, from the ratio i calculated during operation dependent on the number of measurement points m according to (4) and a lookup table mapping the relationship between i and g(i), created in particular initially, for example in an end-of-line determination, the respective associated value g(i) can be determined, possibly by linear interpolation during operation.

Figure 7:
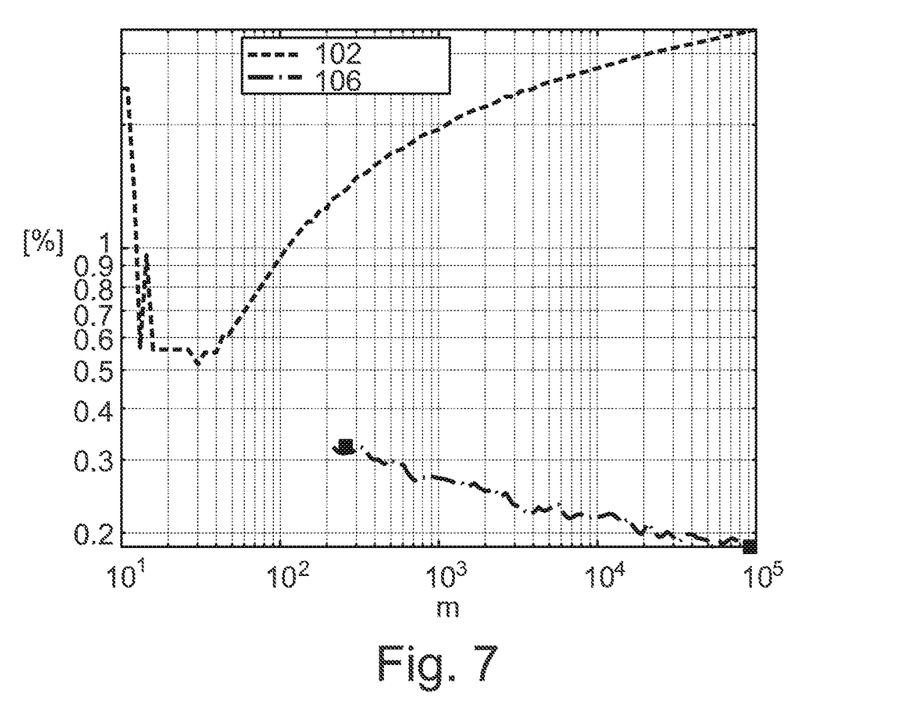
FIG. 7: shows a comparison of the accuracy of an optimized method in another exemplary specific embodiment of the disclosure versus a conventional method.

FIG. 7 shows a comparison of the accuracy of a method in another exemplary embodiment of the disclosure versus a conventional method. In the curve 106, a non-linear dependency according to (6) was assumed between the noise value N and the probability function g(i).

In comparison to the shape of the curve 102 for a conventional method and also in comparison to the method with an assumed linear dependency, the accuracy can be increased even further.

Figure 8:
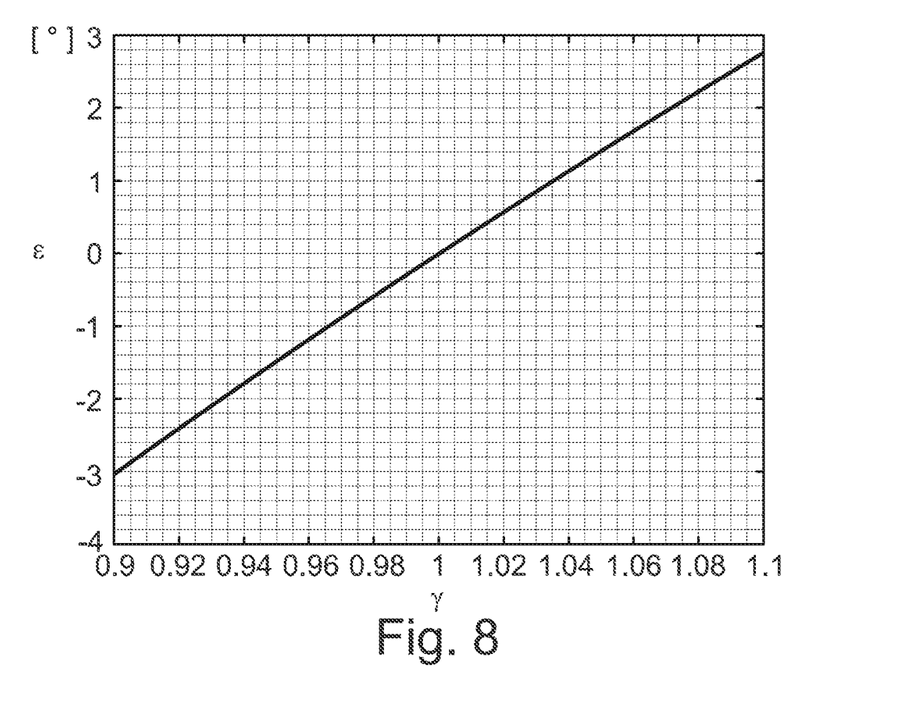
FIG. 8: shows a graph of an angular error as a function of the amplitude ratio.

FIG. 8 shows a graph of an angular error $\epsilon$ as a function of the amplitude ratio $\gamma$. The angular error $\epsilon$ is plotted as a function of the amplitude ratio $\gamma$ according to (9). In practice, the angular error $\epsilon$ should be less than ±0.25%, which means that according to (8) the amplitude difference must not exceed 0.5%. This requirement can be achieved with a number of measurement points m of 2000. If the sampling frequency $f_s$ is 20 kHz the rotational speed n should therefore be below 600 rpm.

LIST OF REFERENCE SYMBOLS

10 Clutch actuator
12 Sensor unit
14 Spindle
16 Electric motor
18 Rotor
20 Planetary roller screw drive
22 Rotational element
24 Rotational component
26 Magnetic ring
28 Sensor element
30 Circuit board
32 Evaluation Unit
100 Method
102 Curve
104 Curve
106 Curve
$A_1$ Amplitude of the first sensor signal
$\hat{A}_1$ Highest amplitude of the first sensor signal
$A_2$ Amplitude of the second sensor signal
$\hat{A}_2$ Highest amplitude of the second sensor signal
$\alpha$ Angular position
c Angle discretization
$\epsilon$ Angular error
$f_s$ Sampling frequency
g Probability function
$\gamma$ Amplitude ratio
i Measurement point ratio
m Number of measurement points
n Rotational speed
N Noise value
$S_1$ First sensor signal
$\tilde{S}_1$ First ideal sensor signal
$S_2$ First sensor signal
$\tilde{S}_2$ Second ideal sensor signal
S Sensor signal
$\tilde{S}_{max}$ Ideal maximum amplitude
$S_{max}$ Maximum amplitude
$\tilde{S}_{min}$ Ideal minimum amplitude
$S_{min}$ Minimum amplitude
T Temperature
AM Amplitude determination step
AW Evaluation step
ÜW Monitoring step
RE Noise detection step
SE Signal acquisition step

The invention claimed is:

1. A method for detecting an angular position of a rotational component rotatable about a rotational axis, the method comprising:
   providing, via a sensor unit, a first sensor signal and a second sensor signal to an evaluation unit, wherein the sensor unit includes a fixed sensor element and a rotational element rotatable relative to the sensor element and jointly with the rotational component, and wherein the first sensor signal is dependent on the angular position, and the second sensor signal is phase-shifted by 90° with respect to the first sensor signal;
   determining, via the evaluation unit, a noise value that is superimposed on each sensor signal due to noise in the corresponding sensor signal;
   then correcting, via the evaluation unit, each sensor signal based on the noise value determined for the corresponding sensor signal;
   determining, via the evaluation unit, highest amplitudes for each of the first and second sensor signals as a maximum value of amplitudes of the respective sensor signals detected over multiple revolutions of the rotational element; and
   determining, via the evaluation unit, the angular position based on output from an atan2-function that takes the first and second sensor signals and the highest amplitudes as input.

2. The method according to claim 1, further comprising adjusting, via the evaluation unit, the noise value that is superimposed on each sensor signal at each revolution of the rotational element.

3. The method according to claim 1, wherein, the highest amplitude of the respective sensor signal is determined as half of a distance between a maximum amplitude and a minimum amplitude of the corresponding sensor signal.

4. The method according to claim 1, further comprising:
   determining, via the evaluation unit, an amplitude error by comparing the highest amplitudes; and
   updating, via the evaluation unit, one of the highest amplitudes based on the amplitude error.

5. The method according to claim 1, further comprising determining, via the evaluation unit, the noise value that is superimposed on each sensor signal based on a number of measurement points.

6. The method according to claim 5, wherein the number of measurement points is at least 2000.

7. The method according to claim 5, wherein the number of measurement points are is determined based on a rotational speed of the rotational element and a sampling frequency of the sensor element.

8. The method according to claim 1, further comprising determining, via the evaluation unit, the noise value that is superimposed on each sensor signal based on a temperature of the sensor unit.

9. The method according to claim 1, wherein the rotational component is a rotor of an electric motor or a component connected in a rotationally fixed manner to the rotor.

10. The method according to claim 1, wherein the sensor element is axially spaced from the rotational element.

11. A detection system for detecting an angular position of a rotational component, the detection system comprising:
  an evaluation unit; and
  a sensor unit configured to provide a first sensor signal and a second sensor signal to the evaluation unit, wherein the sensor unit includes a fixed sensor element and a rotational element rotatable relative to the sensor element and jointly with the rotational component, and wherein the first sensor signal is dependent on the angular position, and the second sensor signal is phase-shifted by 90° with respect to the first sensor signal;
  wherein the evaluation unit is configured to:
    determine a noise value that is superimposed on each sensor signal due to noise in the corresponding sensor signal;
    then correct each sensor signal based on the noise value determined for the corresponding sensor signal;
    determine highest amplitudes for each of the first and second sensor signals as a maximum value of amplitudes of the respective sensor signals detected over multiple revolutions of the rotational element; and
    determine the angular position based on output from an atan 2-function that takes the first and second sensor signals and the highest amplitudes as input.

12. A clutch actuator for a clutch, having a detection system according to claim 11.

13. The detection system according to claim 11, wherein the evaluation unit is further configured to adjust the noise value that is superimposed on each sensor signal at each revolution of the rotational element.

14. The detection system according to claim 11, wherein the evaluation unit is further configured to determine the noise value that is superimposed on each sensor signal based on a number of measurement points.

15. The detection system according to claim 14, wherein the number of measurement points are is determined based on a rotational speed of the rotational element and a sampling frequency of the sensor element.

16. The detection system according to claim 14, wherein the number of measurement points is at least 2000.

17. The detection system according to claim 11, wherein the evaluation unit is further configured to determine the noise value that is superimposed on each sensor signal based on a temperature of the sensor unit.

18. The detection system according to claim 11, wherein the rotational component is a rotor of an electric motor or a component connected in a rotationally fixed manner to the rotor.

19. The detection system according to claim 11, wherein, the highest amplitude of the respective sensor signal is determined as half of a distance between a maximum amplitude and a minimum amplitude of the corresponding sensor signal.

20. The detection system according to claim 11, wherein the sensor element is axially spaced from the rotational element.

* * * * *